(12) United States Patent
Håkansson et al.

(10) Patent No.: US 10,298,716 B2
(45) Date of Patent: May 21, 2019

(54) SERVER, CLIENT DEVICE AND METHODS THEREIN FOR HANDLING CACHED CONTENT RESOURCES

(71) Applicant: Telefonaktiebolaget LM Ericsson (publ), Stockholm (SE)

(72) Inventors: Stefan Håkansson, Hisings Becka (SE); Adam Bergkvist, Luleå (SE); Christer Holmberg, Kirkkonummi (FI); Daniel Lindström, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 169 days.

(21) Appl. No.: 15/103,926

(22) PCT Filed: Apr. 28, 2016

(86) PCT No.: PCT/SE2016/050376
§ 371 (c)(1),
(2) Date: Jun. 13, 2016

(87) PCT Pub. No.: WO2017/188871
PCT Pub. Date: Nov. 2, 2017

(65) Prior Publication Data
US 2018/0097906 A1  Apr. 5, 2018

(51) Int. Cl.
*G06F 15/16* (2006.01)
*G06F 15/173* (2006.01)
(Continued)

(52) U.S. Cl.
CPC .... *H04L 67/2847* (2013.01); *G06F 16/24573* (2019.01); *H04L 9/0825* (2013.01);
(Continued)

(58) Field of Classification Search
CPC ........... G06F 17/30525; H04L 2209/08; H04L 2209/26
(Continued)

(56) References Cited

U.S. PATENT DOCUMENTS 8,245,128 B1 * 8/2012 Ahad ................ G06F 17/30902
205/208
8,812,651 B1 * 8/2014 Eriksen ................ H04L 45/745
709/224
(Continued)

FOREIGN PATENT DOCUMENTS

WO   2011073707 A1   6/2011
WO   2014090761 A1   6/2014

OTHER PUBLICATIONS

"Web Caching"—University of California San Diego, Aug. 2014 https://cseweb.ucsd.edu/classes/wi00/cse291/slides/coop-cache.pdf (Year: 2014).*
(Continued)

*Primary Examiner* — Randy A Scott
(74) *Attorney, Agent, or Firm* — Murphy, Bilak & Homiller, PLLC (57) ABSTRACT

A server (500), a client device (502) and methods therein, for handling cached content resources. When receiving (5:3) a request from the client device (502) in a downloading session, the server (500) identifies (5:4) a set of caches (504, 506) that can be accessed by the client device (502). The server (500) then sends (5:6) a cache map to the client device (502) indicating that a first content resource is stored in a first cache (504) of the identified set of caches and a second content resource is stored in a second cache (506) of the identified set of caches. Thereby, the server (500) is able to adapt the cache map depending on which caches can be accessed by the client device (502), to ensure that the client
(Continued)

device (502) can retrieve the content resources in an efficient manner.

40 Claims, 5 Drawing Sheets

(51) Int. Cl.
  *H04L 29/08* (2006.01)
  *G06F 16/2457* (2019.01)
  *H04L 9/08* (2006.01)
  *H04L 29/06* (2006.01)

(52) U.S. Cl.
  CPC .............. *H04L 29/08* (2013.01); *H04L 67/22* (2013.01); *H04L 67/2814* (2013.01); *H04L 67/2842* (2013.01); *H04L 67/306* (2013.01); *H04L 67/06* (2013.01); *H04L 67/42* (2013.01)

(58) Field of Classification Search
  USPC ........ 709/212, 216, 217, 218, 238; 707/609, 707/610
  See application file for complete search history.

(56) References Cited

U.S. PATENT DOCUMENTS

| | | | |
|---|---|---|---|
| 2013/0144979 A1* | 6/2013 | Kansal | H04N 21/23106 709/219 |
| 2014/0359045 A1 | 12/2014 | Mirarchi et al. | |
| 2015/0039717 A1* | 2/2015 | Chiu | H04L 67/2842 709/214 |
| 2015/0215396 A1 | 7/2015 | Puthalath et al. | |
| 2015/0350368 A1 | 12/2015 | Tan et al. | |
| 2016/0142487 A1* | 5/2016 | Mettu | H04L 67/1097 709/219 |

OTHER PUBLICATIONS

Eriksson, G. et al., "Delivering content via Out-Of-Band Cache", Network Working Group Internet-Draft Intended Status: Informational, Oct. 6, 2015, 1-23.
Russell, Alex et al., "Service Workers Nightly", W3C Editor's Draft Feb. 8, 2016, Feb. 8, 2016, 1-69.
Unknown Author, "Caching HTTPS—Shared caching without the baggage", 1-45.
Eriksson, G. et al., "Delivering content via Out-Of-Band Cache", Network Working Group, Ericsson, Oct. 1, 2015, 1-14.

* cited by examiner

SERVER, CLIENT DEVICE AND METHODS THEREIN FOR HANDLING CACHED CONTENT RESOURCES

TECHNICAL FIELD

The disclosure relates generally to servers, client devices and methods therein as well as computer programs and computer program storage products, for handling cached content resources.

BACKGROUND

In recent years, the amount of traffic over communication networks such as the Internet and wireless networks has increased greatly due to extensive usage of various web services where users download content such as web pages from different web sites to their client devices. In this disclosure, the term "client device" is used to represent any communication entity that is capable of downloading content from a server or other content storage over a communication network. Further, the term "server" is used to represent any communication entity that is capable of delivering content such as web pages to client devices over a communication network which may include the Internet and/or a wireless network. The server mentioned throughout this disclosure could also be referred to as a content server, an origin server, a content server host or an origin server host.

Typically, web pages, or parts thereof, are downloaded in a browsing session where a user of a client device can browse a web site or the like and click on links to obtain various web resources. Other types of content such as movies, music and TV programs can also be downloaded from a server. The term "content resource" is used herein to represent any content that can be downloaded in a browsing session. A content resource may thus, without limitation, be a web page or some part thereof, or some video or audio content which can be accessed from a web site.

In order to reduce the amount of traffic caused by such downloading, caching can be employed where content resources offered by a server are stored at a location which is "closer" to the client devices in terms of the number of transport links and network nodes involved, thereby reducing the transport distance and also the time it takes to get a requested content resource. For example, frequently requested content resources may be cached in this manner so as to reduce the traffic in the network caused by such requests and resulting communication between the client devices and the server, referred to as round-trips.

The location where content resources are cached in this manner is commonly referred to as a "cache" which term will be used herein. A cache is thus a storage for content resources. The term "origin server" is also commonly used to denote a server, or server host, where content is originally stored which content may be temporarily stored, i.e. cached, in a cache.

When content resources are downloaded from a server by accessing a web site or the like, a large number of round-trips between client device and server may be required when each content resource must be requested separately, only to be directed to the cache. This is required when HTTPS (Hypertext Transfer Protocol Secure) is employed while when HTTP (Hypertext Transfer Protocol) is employed the requests are terminated in the cache. For HTTPS the concept of "Blind Caching", BC, also known as "Out-of-Band Caching", OOBC, has been introduced to allow efficient caching also when HTTPS is employed. Briefly described, BC or OOBC allows for fetching content resources directly from a cache even when the content resources are encrypted e.g. using HTTPS. The number of round-trips in a browsing session can be reduced by employing a so-called cache map with information about where a range of different content resources can be fetched or retrieved from a cache. The cache map may also be referred to as a resource map. Throughout this disclosure, the terms "retrieving" and "downloading" are used interchangeably.

In brief, the server, typically an origin server or similar, sends the cache map to the client device early in a downloading session, and each time a new content resource is to be fetched, such as when a user clicks on or otherwise activates a link in a web page, the client device checks if that content resource is present on the cache map. A web page may be associated with numerous individual content resources, sometimes hundreds of them, and when the user navigates to such a web page the client device needs to fetch all these content resources. If any of the content resources are present on the cache map, the client device can retrieve those content resources from a cache according to the cache map, instead of requesting them from the server only to be directed to the cache. For further description of the cache map, reference is made to "Delivering content via Out-Of-Band Cache" draft-eriksson-oob-cache-00.text, by G. Eriksson and C. Holmberg: https://github.com/EricssonResearch/blind-cache-draft/blob/master/draft-eriksson-oob-cache-latest.txt, retrieved on Feb. 8, 2016.

However, it is a problem with conventional procedures that the above-described caches for storing and providing content resources to client devices may not be utilized in an efficient manner. For example, a cache indicated in a cache map for a content resource may not be suitable for retrieving the content resource therefrom by a client device.

SUMMARY

By using a server, a client device and methods therein as defined in the attached independent claims, the handling of cached content resources can be improved and made more efficient, e.g. in terms of latency and load, as compared to conventional procedures.

According to one aspect, a method is performed in a server for handling cached content resources. In this method the server receives a request from a client device in a downloading session, and identifies a set of caches that can be accessed by the client device. The server then sends a cache map to the client device in a response to the received request, wherein the cache map indicates that a first content resource is stored in a first cache of the identified set of caches and a second content resource is stored in a second cache of the identified set of caches.

Thereby, it is an advantage that the server is able to adapt the cache map to the client device and to ensure that the client device can retrieve the content resources in an efficient manner. It is also possible for the server to distribute load on the caches caused by the device's retrieving operations, by configuring the cache map. Another advantage is that it is not necessary for the server to push or transfer a content resource to a cache not having this content resource, if it is already stored and available from another cache that is identified as accessible to the client device.

Further, if the cache map indicates that a content resource is stored in more than one cache, the client device is able to select the best cache, e.g. in terms of proximity, cost, etc., and retrieve the content resource therefrom, if needed. The selection of cache may be controlled by at least one predefined selection criterion, e.g. using priorities assigned to the caches.

According to another aspect, a computer program storage product comprises instructions which, when executed on a server, cause the server to carry out the above-described method.

According to another aspect, a computer program comprises instructions which, when executed on a server, cause the server to carry out the above-described method.

According to another aspect, a server is arranged to handle cached content resources. The server comprises a processor and a memory containing instructions executable by the processor, whereby the server is configured to operate as follows. The server is configured to receive a request from a client device in a downloading session, and to identify a set of caches that can be accessed by the client device. The server is also configured to send a cache map to the client device in a response to the received request, the cache map indicating that a first content resource is stored in a first cache of the identified set of caches and a second content resource is stored in a second cache of the identified set of caches.

The server may be configured to transfer at least one content resource indicated in the cache map to a cache in the identified set of caches.

The cache map may in an embodiment of the server indicate that at least one content resource is stored in at least two caches of the identified set of caches, thereby enabling the client device to select one of the at least two caches and retrieve the at least one content resource from the selected cache.

In one embodiment of the server, the cache map comprises at least one selection criterion controlling which one of the at least two caches should be selected by the client device. The selection criterion may in that case indicate that one of the at least two caches should be selected for retrieving the at least one content resource if a predefined condition is fulfilled. The predefined condition may be related to any of: time of day or week, current position of the client device, current battery status in the client device, available memory space in the client device, current network throughput, and retrieval cost. The selection criterion may indicate that one of the at least two caches should be attempted first for retrieving the at least one content resource. In the latter case, the selection criterion may comprise priorities of the at least two caches to indicate an order of attempting to retrieve the at least one content resource. The selection criterion may be configured depending on current load on the at least two caches.

The server may be configured to poll the first and second caches to check if the first and second content resources, respectively, are stored there before sending the cache map to the client device.

According to another aspect, a method is performed in a client device for handling cached content resources. In this method the client device receives a cache map from a server during a downloading session, the cache map indicating that at least one content resource is stored in at least two caches. The client device then selects one of the at least two caches and retrieves the at least one content resource from the selected cache. It is thus an advantage that the client device is able to select a cache that is considered best, e.g. in terms of proximity and/or cost.

According to another aspect, a computer program storage product comprises instructions which, when executed on a client device, cause the client device to carry out the above-described method.

According to another aspect, a computer program comprises instructions which, when executed on a client device, cause the client device to carry out the above-described method.

According to another aspect, a client device is arranged to handle cached content resources. The client device comprises a processor and a memory containing instructions executable by the processor, whereby the client device is configured to operate as follows. The client device is configured to receive a cache map from a server during a downloading session, which cache map indicates that at least one content resource is stored in at least two caches. The client device is further configured to select one of the at least two caches, and to retrieve the at least one content resource from the selected cache.

In one embodiment of the client device and the server, the cache map may comprise at least one selection criterion controlling which one of the at least two caches should be selected, and wherein said selecting of cache is performed according to the selection criterion. The selection criterion may indicate that one of the at least two caches should be selected for retrieving the at least one content resource if a predefined condition is fulfilled. The predefined condition may be related to any of: time of day or week, current position of the client device, current battery status in the client device, available memory space in the client device, current network throughput, and retrieval cost. The selection criterion may indicate that one of the at least two caches should be attempted first for retrieving the at least one content resource, and in that case, the selection criterion may comprise priorities of the at least two caches to indicate an order of attempting to retrieve the at least one content resource.

Said selecting of cache and retrieving of the at least one content resource from the selected cache, may in one embodiment of the client device be controlled by means of a caching agent implemented in either of:
   a client application running in the client device,
   a script of a ServiceWorker, and
   a HyperText Transfer Protocol, HTTP, Library.

The cache map may in an embodiment of the client and the server comprise a first encryption key useful for decrypting the at least one content resource when retrieved from a first one of the caches, and a second encryption key useful for decrypting the at least one content resource when retrieved from a second one of the caches. In that case, the first encryption key may be indicated by metadata in an entry for the first cache in the cache map, and the second encryption key may be indicated by metadata in an entry for the second cache in the cache map. The cache map may be received in response to a request sent to the server in the downloading session.

According to another aspect, a server is arranged to handle cached content resources. The server comprises a receiving unit configured to receive a request from a client device in a downloading session, and an identifying unit configured to identify a set of caches that can be accessed by the client device. The server also comprises a sending unit configured to send a cache map to the client device in a response to the received request, the cache map indicating that a first content resource is stored in a first cache of the identified set of caches and a second content resource is stored in a second cache of the identified set of caches.

According to another aspect, a client device is arranged to handle cached content resources. The client device comprises a receiving unit configured to receive a cache map from a server during a downloading session, the cache map indicating that at least one content resource is stored in at least two caches. The client device further comprises a selecting unit configured to select one of the at least two caches, and a retrieving unit configured to retrieve the at least one content resource from the selected cache.

The above servers, client devices and methods may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable efficient retrieval of cached content resources for a client device, and also to generally enable flexible and efficient distribution of content resources across multiple caches. The above can be achieved as follows. When the client device sends a request to a server in a downloading session, the server identifies a set of caches that can be accessed by the client device. These accessible caches may be indicated in the request itself or may be known by the server in beforehand, e.g. in the form of preconfigured capabilities or the like. The server then sends a cache map to the client device indicating that content resources are stored in two or more of the caches identified as accessible to the client device.

In more detail, the cache map indicates that at least a first content resource is stored in a first cache and a second content resource is stored in a second cache, where both the first and second caches are present in the identified set of caches. This way, the server is able to adapt the cache map depending on which caches can be accessed by the client device and to ensure that the client device can retrieve the content resources in an efficient manner. Since the cache map points to more than one cache, it is also possible to distribute the load on the caches caused by the device's retrieving operations, in a flexible manner. Another advantage is that it is not necessary for the server to push or transfer a content resource to a cache not having this content resource, if it is already stored and available from another cache that is identified as accessible to the client device.

Further, a content resource may be stored in more than one cache, which can be indicated in the cache map such that the client device is able to select the best cache and retrieve the content resource therefrom, if needed. The term "best cache" implies that this cache is in some respect the most suitable one for retrieval, e.g. in terms of proximity meaning that the cache may be "closer" to the client device in that the number of transport links and network nodes there between may be less than the other cache(s) having the same content resource. Thereby, the transport distance and also the time it takes to retrieve the content resource will be shorter. The choice of cache may further be controlled by means of one or more selection criteria which may be comprised in the cache map sent to the client device. Some examples of how a selection criterion could be used will be described later below.

Figure 1:
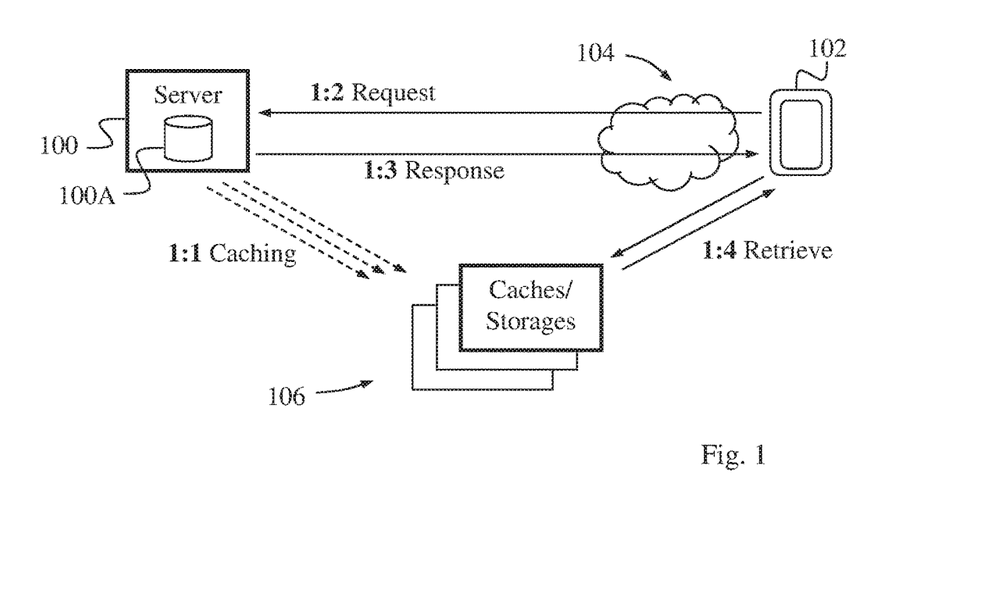
FIG. 1 is a communication scenario illustrating how a cache can be used for providing content resources, which may be employed when implementing embodiments described herein.

FIG. 1 illustrates a communication scenario where the solution may be employed as follows. In this scenario, a server 100 is operative to enable a client device 102 to download content resources over a communication network 104. In other words, the server 100 is operative to provide content resources to the client device 102. "Communication network" is a general term used here to represent any type of network(s) over which content resources can be transported, e.g. including a wireless or mobile network if the client device 102 is a wireless device capable of radio communication. The solution described herein is also applicable for a client device using a fixed or wired connection to the communication network 104. The schematically illustrated communication network 104 may also include the Internet. The server 100 may comprise a storage 100A holding all content resources provided by the server 100 so that any content resource can be downloaded, i.e. fetched, from the server 100 itself if not from a cache.

In some examples described herein it is assumed that the client device is operated by a user, although the embodiments herein are not limited thereto and some non-limiting examples of devices are outlined below. The client device 102 is in this example schematically illustrated as a mobile phone in the form of a smartphone in FIG. 1, but it may also be any of a laptop computer, a tablet computer, a set top box, a smart TV, a wireless modem, and a sensor device. It may also be a more stationary device such as a telematics unit embedded in or attachable to a vehicle, such as a car, truck, bus, boat, train, airplane and flying drone. The client device 102 may also for example be embedded in or attachable to a domestic appliance, such as in white goods, door locks, surveillance and alarm equipment and autonomous vacuum cleaners and grass cutters.

The client device may also be embedded in or attachable to telematics units for robots and 3D printers used for industrial purposes or for domestic support functions. Other examples of where the client device may be incorporated or added to is in public service equipment, such as street lamps, surveillance cameras, and entrance admittance equipment for public transport. The client device described herein may in other words be, or be implemented in, any equipment which is able to utilize the connectivity to the communication network 104. Further examples of such client devices are equipment used in healthcare and in payment terminals, e.g. payment terminals for credit cards.

A first action 1:1 illustrates that the server 100 performs caching of various content resources by storing them in different caches 106, hence referred to as caching, for enabling faster downloads to client devices. For example, the server 100 may transfer content to the caches 106, or the server may alternatively send a list of content resources to the caches 106 which in turn will fetch those resources from the server 100. Alternatively, a cache 106 may fetch the content resource from the server 100 if the requested resource was not available on the cache. It was described above how caching can provide more efficient downloading of content resources. It is assumed that the client device 102 is able to fetch content resources from at least some of the caches 106 more efficiently than fetching them from the server 100. This caching action may be performed once and for all, or at different occasions, e.g., whenever a content resource becomes available in the server 100 or whenever a content resource is requested by a client device.

The following actions in FIG. 1 illustrate how a download session may be executed for the client device 102 in the shown scenario. The download session may start e.g. when a user clicks on a link to a web page or other content, or when some application running in the device needs a content resource, which triggers the client device 102 to send a content request to the server 100. The next action 1:2 thus illustrates that the client device 102 accordingly sends a download request to the server 100, which may be the very first, or at least an "early", request for a content resource in the download session. As mentioned above, selecting a link to some content may trigger the client device to download a series of individual content resources associated to that link, each downloading operation normally requiring a download request from the client device.

In response to the download request of action 1:2, the server 100 sends a response that includes a cache map to the client device 102, illustrated by a following action 1:3. The response in this action may also contain a content resource requested in the download request. The sent cache map indicates that content resources are stored in two or more caches that have been identified as accessible to the client device, which will be described in more detail later below. Examples of how the cache map may be configured in practice by the server 100 will also be described later below. A final action 1:4 illustrates that the client device 102 retrieves one or more content resource from at least one of the caches 106, in accordance with the cache map.

In the communication of the above-described actions, the protocol HTTP may be used, e.g. according to any of the following 3 examples.

Example 1: the client device 102 sends a HTTP GET request for a content resource in action 1:2. In response thereto, the server 100 sends a 200 OK in action 1:3, adding content-encoding: out-of-band. The content of the 200 OK contains the cache map instead of the actual resource.

Example 2: the client device 102 sends a HTTP GET request for a content resource in action 1:2. In response thereto, the server 100 sends a 200 OK in action 1:3 with content-type: multipart/mixed. One part of the body is the requested content and the other is the cache map.

Example 3: the client device 102 sends a HTTP GET request for a content resource in action 1:2. In response thereto, the server 100 sends a 200 OK in action 1:3 with a link header and a body containing the requested resource. The link header in the 200 OK informs the client device 102 that there is a cache map available from a certain cache map address. The link header in the 200 OK may e.g. be
Link: <https:///a_server.com/path_to_resource_map>; rel="resource-map"

The client then sends a HTTP GET request to the cache map address and gets the cache map.

An example will now be described, with reference to the flow chart in FIG. 2, of how the solution may be employed in terms of actions which may be performed in a server, such as the above-described server 100, for handling cached content resources. Reference will sometimes also be made, without limiting the described features, to the example shown in FIG. 1. The procedure illustrated by FIG. 2 can thus be used to accomplish the functionality described above for the server 100 in communication with the client device 102.

A first action 200 illustrates that the server 100 receives a download request from the client device 102 in a downloading session. It has been described above, with reference to action 1:2, how such a download request may be communicated. In a following action 202, the server 100 identifies a set of caches that can be accessed by the client device 102. The identified set of caches could also be referred to as the "accessible caches" for short, which term will be used herein.

The above identification of accessible caches may be done in accordance with any of the following non-limiting examples. In one example, the client may indicate which caches it is able to access in the request itself, e.g. in the form of a list of accessible caches. In another example, the server 100 may be able to identify the accessible caches by accessing some capabilities or the like that have been preconfigured for the client device 102. Such capabilities may be maintained by the server 100 itself or by an access network, e.g. a wireless network, used by the client device 102.

The server 100 is then able to create a cache map that is adapted to the client device 102 by "pointing" to at least some of the identified accessible caches where various content resources can be retrieved. The server 100 may select which content resources to include in the cache map for the client device 102, which is however somewhat outside the scope of this procedure. This may be done in several different ways, depending on the circumstances. One possibility is to include all content resources that have been cached by the server 100, or a selection of content resources that are deemed to be of potential interest to the client device.

It may happen that a content resource to be included in the cache map is not currently stored in any of the identified accessible caches. In that case, the server could select one of the accessible caches and transfer that content resource to the selected cache. A next optional action 204 indicates thus an example embodiment where the server 100 may transfer at least one content resource indicated in the cache map to one or more caches in the identified set of caches. Before this action is executed, the server may investigate whether the at least one content resource is already stored in any of the identified caches. If so, the server can just indicate the content resource(s) in the cache map accordingly. If not, action 204 should be executed as well.

A final action 206 illustrates that the server 100 sends the cache map to the client device 102 in a response to the received download request of action 200. The sent cache map indicates, at least, that a first content resource is stored in a first cache of the identified set of caches and a second content resource is stored in a second cache of the identified set of caches. In fact, it is possible that the cache map may indicate that any number of content resources is stored in either of the first and second caches, and the solution is not limited in this respect. Further, the cache map may indicate any number of accessible caches where content resources of potential interest are stored, and the solution is not limited in this respect either.

Various further non-limiting embodiments are possible to employ in the above-described procedure and some examples of embodiments will now be outlined. In one example embodiment, the first and second caches may be polled to check if the first and second content resources, respectively, are stored there before sending the cache map to the client device 102. For example, the server 100 may need to be confirmed that the first and second content resources are still being stored in the respective caches to make sure the cache map is relevant and useful to the client device.

In another example embodiment, the cache map may indicate that at least one content resource is stored in at least two caches of the identified set of caches, thereby enabling the client device 102 to select one of the at least two caches and retrieve the at least one content resource from the selected cache. In that case, another example embodiment is that the cache map may comprise one or more selection criteria controlling which one of the at least two caches should be selected by the client device. The selection criteria may be configured by the server 100, e.g. depending on the current load situation or capacity in the caches and/or in the network 104. This way, the server is able to control the load distribution across the caches by configuring the selection criteria, e.g. to avoid overload on one cache by directing the client device to retrieve one or more content resources from another cache that is less loaded or even "underused". The selection criteria may also be related to the location or proximity of the caches relative the client device 102.

Some additional example embodiments of how the selection criteria could be used will now be outlined. In a further example embodiment, the selection criterion/criteria may indicate that one of the at least two caches should be selected for retrieving the at least one content resource if a predefined condition is fulfilled. In further example embodiments, the above predefined condition may be related to any of the following factors A-F:

A) Time of day or week. This predefined condition may be configured depending on normal or expected load on the caches at different times so as to avoid any overload. For example, the predefined condition may dictate that one cache should be selected during business hours, and that another cache should be selected outside the business hours.

B) Current position of the client device. This predefined condition may be configured depending on the device's current proximity to the respective cache basically with respect to transport distance and/or the time it would take to retrieve the content resource. For example, the predefined condition may dictate that one cache should be selected when the client device is located in one area, and that another cache should be selected when the client device is located in another area. In another example, the predefined condition may be dependent on the geographical position of the client device and the cache, respectively, such as whether they are within the same country or not, in order to take national regulations or roaming obstacles into account.

C) Current battery status in the client device. This predefined condition may be configured depending on how much power is left in the battery. For example, the predefined condition may dictate that the client device should refrain from retrieving the content resource altogether when the battery level is below the threshold.

D) Available memory space in the client device. This predefined condition may be configured depending on whether there is enough room in the memory for storing the content resource. For example, the predefined condition may dictate that one cache should be selected when the memory space is above some threshold, and that another cache where the content resource is stored with less information bits should be selected when the memory space is below that threshold. The predefined condition may also dictate that the client device should refrain from retrieving the content resource altogether when the memory space is below the threshold.

E) Current network throughput. This predefined condition may be configured depending on different throughput in different parts of the network used for downloading, such as the communication network 104 in FIG. 1. For example, the predefined condition may dictate that one cache should be selected when the throughput in the network part used for accessing that cache is greater than the throughput in the network part used for accessing another cache.

F) Retrieval cost. The use of caching may be associated with a cost that may differ between caches. By including the cost in the cache map the client can select the appropriate cache depending on the current situation. For example it may be preferable to select a cache of relatively low cost but bad performance if cost is deemed more important or critical than performance.

In another example embodiment, the selection criterion may, as an alternative to using a predefined condition, indicate that one of the at least two caches should be attempted first for retrieving the at least one content resource. This embodiment may be employed in case it is desirable that this "preferred" cache should primarily be used, if possible. If the retrieval fails, the client device may attempt to retrieve the content resource from another cache indicated in the cache map. In another example embodiment, the selection criterion may comprise priorities of the at least two caches to indicate an order of attempting to retrieve the at least one content resource. For example, if a content resource is stored in three caches C1, C2, C3, the selection criterion may indicate descending priorities for C1-C3 indicating that the client device should attempt retrieval of the content resource in that order.

In another example embodiment, the selection criterion may be configured depending on current load on the at least two caches. This embodiment can thus be used as another means to distribute the load across the caches, e.g. as a more dynamic and load-sensitive alternative to the above-described predefined condition of factor A) which is fixed for different times of day or week based on expected load.

The content resources may be stored in the caches in encrypted form and different encryption keys may be used in different caches, e.g. to provide protection from unauthorized downloading. In another example embodiment, the cache map may in this case comprise a first encryption key useful for decrypting the at least one content resource when retrieved from a first one of the at least two caches, and further comprise a second encryption key useful for decrypting the at least one content resource when retrieved from a second one of the at least two caches. Although only a first key and a second key are mentioned in the above embodiment, it can be understood that it is possible to use any number of encryption keys for protection of content resources in any number of caches. The same encryption key may also be used in more than one cache.

In another example embodiment, the first encryption key may be indicated by metadata in an entry for the first cache in the cache map, and the second encryption key may be indicated by metadata in an entry for the second cache in the cache map. An example of this embodiment will be described later below with reference to FIG. 6.

Another example will now be described, with reference to the flow chart in FIG. 3, of how the solution may be employed in terms of actions which may be performed in a client device, such as the above-described client device 102, for handling cached content resources. Reference will sometimes also be made, without limiting the described features, to the example shown in FIG. 1. The procedure illustrated by FIG. 3 can thus be used to accomplish the functionality described above for the client device 102 in communication with the server 100.

Figure 2:
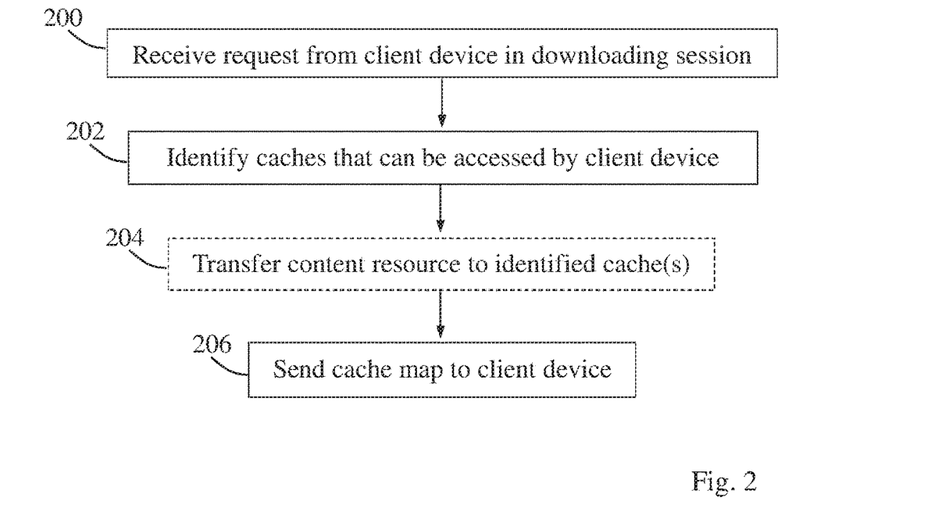
FIG. 2 is a flow chart illustrating a procedure in a server, according to some possible embodiments.

A first optional action 300 illustrates that the client device 102 may send a download request to the server 100 in a downloading session, thus corresponding to action 200 in FIG. 2. In a next action 302, the client device 102 receives a cache map from the server 100 during a downloading session, the cache map indicating that at least one content resource is stored in at least two caches.

At some point later, it is discovered that the client device 102 needs to retrieve the at least one content resource indicated in the cache map, e.g. when a user selects a link or the like, or when an application in the device requires the content resource(s) for its operation. In a following action 304, the client device 102 selects one of the at least two caches that were indicated in the received cache map, e.g. based on the above described selection condition. Some examples of how this selection may be done will be mentioned later below with reference to further example embodiments. A final action 306 illustrates that the client device 102 retrieves the at least one content resource from the selected cache. The retrieval as such of a content resource may be done in a conventional manner which is not necessary to described herein.

In one example embodiment, the cache map may comprise selection criterion controlling which one of the at least two caches should be selected, and said selecting of cache may in that case be performed according to the selection criteria. It has been described above how such a selection criterion may be employed by the server. Nevertheless, some example embodiments of the selection criterion are briefly outlined as follows.

In another example embodiment, the selection criterion may indicate that one of the at least two caches should be selected for retrieving the at least one content resource if a predefined condition is fulfilled. In another example embodiment, the predefined condition is related to any of: time of day or week, current position of the client device, current battery status in the client device, available memory space in the client device, current network throughput, and retrieval cost. These factors have been discussed in more detail above which will not be repeated here.

In another example embodiment, the selection criteria may, instead of using the above predefined condition, indicate that one of the at least two caches should be attempted first for retrieving the at least one content resource. In that case, another example embodiment, may be that the selection criterion comprises priorities of the at least two caches to indicate an order of attempting to retrieve the at least one content resource.

Figure 4A:
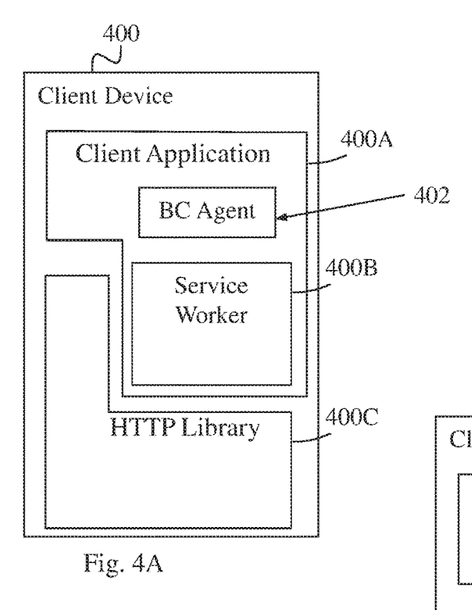
FIG. 4 is a block diagram illustrating examples of how a client device may be configured for enabling embodiments described herein.
Figure 4B:
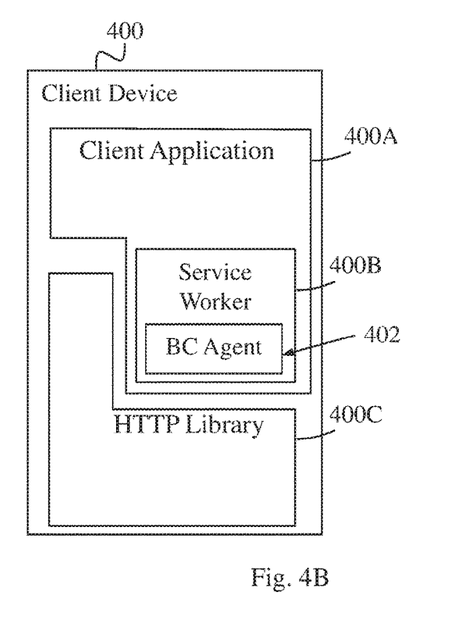
Figure 4C:
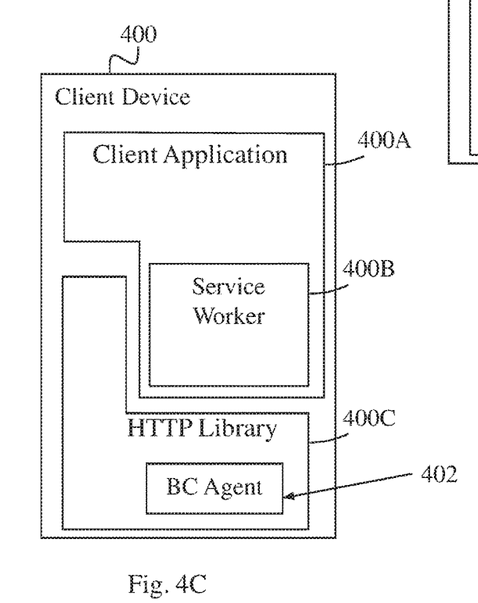

In some further example embodiments, the pre-fetching of the at least one content resource from the cache may be executed by means of a caching agent in the client device. FIG. 4A-4C illustrate some examples of how such a caching agent may be implemented in the client device 400. The caching agent 402 is denoted "BC agent" in these examples where BC stands for Blind Cache. The caching agent 402 may be implemented in either of:
- a client application 400A running in the client device, as shown in FIG. 4A,
- a script of a ServiceWorker 400B, as shown in FIG. 4B, and
- a HyperText Transfer Protocol, HTTP, Library 400C, as shown in FIG. 4C.

In another example embodiment, the cache map may comprise a first encryption key useful for decrypting the at least one content resource when retrieved from a first one of the caches, and a second encryption key useful for decrypting the at least one content resource when retrieved from a second one of the caches. In another example embodiment, the first encryption key may be indicated by metadata in an entry for the first cache in the cache map, and the second encryption key is indicated by metadata in an entry for the second cache in the cache map.

In another example embodiment, the cache map may be received in response to a request sent to the server in the downloading session. This embodiment is illustrated by action 300 in FIG. 3.

Figure 5:
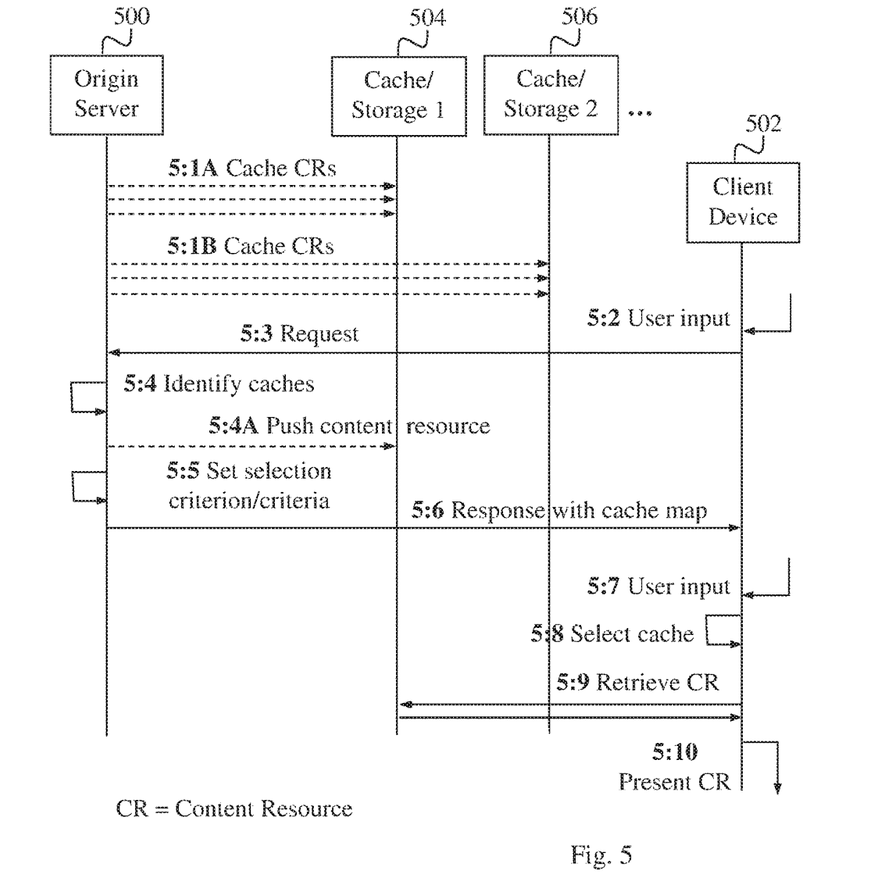
FIG. 5 is a signaling diagram illustrating a more detailed example of a procedure when the solution is used, according to further possible embodiments.

Another illustrative but non-limiting example of how a server and a client device may operate in more detail and when at least some of the above-described embodiments are used, will now be described with reference to the signalling diagram in FIG. 5. In this figure, a server 500, a client device 502 and a set of accessible caches 504, 506 ... are shown. It is thus assumed that the shown caches 504, 506 represent a set of caches that can be accessed by the client device 502 which could be comprised of any number of caches while only two are discussed here for simplicity.

The first shown actions 5:1A and 5:1B illustrate that the server 500 caches various content resources in the caches 504, 506, respectively, which correspond to the above-described action 1:1. Content resource is denoted CR in the figure. In a next action 5:2 the client device 502 receives some input from a user which triggers a downloading session which starts with the client device 502 sending a download request to the server 500, in an action 5:3, which corresponds to the above-described actions 1:2, 200 and 300. The input in action 5:2 may alternatively come from some application running in the device 502.

In a next action 5:4, the server 500 identifies the set of caches 504, 506 that can be accessed by the client device 502. This action corresponds to the above-described action 202. Here, it should be understood that the server 500 may identify any number of accessible caches and the solution is not limited in this respect. Some examples of how this action may be performed have been described above. It was mentioned above that a content resource to be included in the cache map may not be currently stored in any of the identified accessible caches 504, 506. The server 500 may in that case select one of the accessible caches and transfer the content resource to the selected cache 504, in another action 5:4A. After action 5:4, the server 500 may thus check if the content resource to be included is already stored in any of the identified accessible caches 504, 506, and if no such cache is found action 5:4A is performed.

In a next action 5:5, the server 500 can optionally set selection criterion and include it in the cache map. It has also been described above how such selection criterion could be defined depending on various factors and circumstances which will not be repeated here. The server 500 then sends a response with the cache map to the client device 502, in an action 5:6, which corresponds to the above-described actions 1:3, 206 and 302. In this example, the response also includes the selection criterion set in action 5:5.

At some point later, the client device 502 receives some input from a user, in an action 5:7, which indicates that a content resource is needed to be presented or used, e.g. played out, at the client device 502. The client device 502 then checks the previously received cache map and discovers that the needed content resource is available from both cache 504 and cache 506. A further action 5:8 illustrates that the client device 502 selects cache 504 in accordance with the previously likewise received selection criterion, and retrieves the needed content resource from the selected cache 504, in another action 5:9. Once the content resource has been retrieved, it can be presented or otherwise used at the client device 502, as shown in a final action 5:10. It should be noted that action 5:7, and the subsequent actions 5:8-5:10, can be performed without specific user input. The first server response to which the cache map is attached may be an html page, and as the client device 502 parses the page additional content resources may be retrieved.

Figure 6:
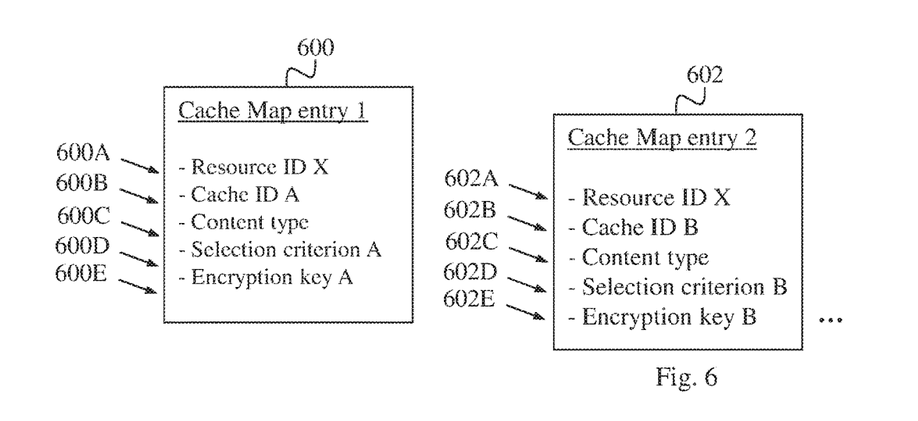
FIG. 6 is a schematic illustration of entries in a cache map, according to further possible embodiments.

It was mentioned above that the cache map may be configured in different ways to realize the solution and embodiments described herein, and that encryption keys may be indicated by metadata in the cache map. An example of two cache map entries indicating that the same content resource is stored in two different accessible caches, is schematically illustrated in FIG. 6. A first cache map entry 600 comprises an identification of the content resource in question at 600A, denoted "Resource ID X", and an identification of a first cache at 600B where the content resource is available, denoted "Cache ID A". The other cache map entry 602 comprises the same identification "Resource ID X" of the content resource at 602A, and an identification of a second cache at 602B where the content resource is also available, denoted "Cache ID B". Both entries 600, 602 also contain information about what type of content the resource is, at 600C and 602C, respectively.

The cache map entry 600 further comprises metadata at 600D which includes the above-described selection criterion/criteria denoted "Selection criterion A", and further metadata at 600E which includes encryption information such as an encryption key denoted "Encryption key A", in case the content resource is encrypted in the first cache A and needs to be decrypted by the client device. In the same way, cache map entry 602 comprises metadata at 602D including a selection criterion/criteria denoted "Selection criterion B", which may be different from Selection criterion A, and further metadata at 602E including an encryption key denoted "Encryption key B", which may be different from Encryption key A or not. An example of how cache map entries may be configured in practice for three different content resources distributed across three caches is presented below.

```
[
  {
    "resource-origin": "https://origin.com/image/dog.jpg",
    "resource-mapped": "https://origin.com/abc/001",
    "content-type": "image/jpeg",
    "mapped-host": "bc1.com"
  },
  {
    "resource-origin": "https://origin.com/image/car.jpg",
    "resource-mapped": "https://origin.com/efg/007",
    "content-type": "image/jpeg",
```

```
    "mapped-host": "bc2.com",
    "encryption": {
      "key": "some-secret-key",
      "salt": "some salt"
    }
  },
  {
    "resource-origin": "https://origin.com/image/cat.jpg",
    "resource-mapped": "https://origin.com/abc/003",
    "content-type": "image/jpeg",
    "mapped-host": "bc3.com"
  }
]
```

The above example thus shows three cache map entries for three respective content resources including images of a dog, a car and a cat, which are stored in three different caches denoted bc1, bc2 and bc3, respectively. In this example, encryption is employed only for car.jpg in cache bc2 using an encryption key schematically denoted "some-secret-key".

Another example of how cache map entries may be configured in practice for one content resource, the car image, being stored in two caches bc1 and bc2, is presented below.

```
[
  {
    "resource-origin": "https://origin.com/image/car.jpg",
    "resource-mapped": "https://origin.com/abc/002",
    "content-type": "image/jpeg",
    "mapped-host": "bc1.com",
    "encryption": {
      "key": "some-secret-key",
      "salt": "some salt"
    }
  },
  {
    "resource-origin": "https://origin.com/image/car.jpg",
    "resource-mapped": "https://origin.com/yay/88aj93f",
    "content-type": "image/jpeg",
    "mapped-host": "bc2.com",
    "encryption": {
      "key": "some-secret-key",
      "salt": "some salt"
    }
  }
]
```

In this example, encryption is employed in both caches bc1 and bc2 using an encryption key schematically denoted "some-secret-key". It should be noted that the same key or different keys may be used in caches bc1 and bc2, as mentioned above Yet an example of how the above two cache map entries may be configured in practice when selection criterion/criteria are added, is presented below.

```
[
  <snip>
  {
    "resource-origin": "https://origin.com/images/car.jpg",
    "resource-mapped": "https://origin.com/abc/002",
    "content-type": "image/jpeg",
    "mapped-host": "bc1.com",
    "encryption": {
```

-continued

```
        "key": "some-secret-key",
        "salt": "some salt"
      },
      "selection-criterion": [
        { "time": "<9am" },
      ],
    },
    {
      "resource-origin": "https://origin.com
/images/car.jpg",
      "resource-mapped": "https://origin.com/abc/002",
      "content-type": "image/jpeg",
      "mapped-host": "bc2.com",
      "encryption": {
        "key": "some-secret-key",
        "salt": "some salt"
      },
      "selection-criterion": [
        { "time": ">=9am" }
      ]
    <snip>
]
```

The above example thus shows that the content resource car image should be retrieved from cache bc1 if the current time is earlier than 9 am, and that it should be retrieved from cache bc1 if the current time is at or later than 9 am.

A non-limiting example of how a server and a client device may be structured to bring about the above-described solution and embodiments thereof, will now be described with reference to the block diagram in FIG. 7. In this figure, the server 700 and the client device 702 may be configured to operate according to any of the examples and embodiments of employing the solution as described above, where appropriate, and as follows. Each of the server 700 and the client device 702 is shown to comprise a respective processor 700P, 702P, a respective memory 700M, 702M and a communication circuit denoted "C" with suitable equipment for transmitting and receiving information and messages in the manner described herein.

The communication circuit C in each of the server 700 and the client device 702 thus comprises equipment configured for communication using a suitable protocol depending on the implementation. It was mentioned above that HTTP may be used in the communication. The solution is however not limited to any specific types of messages or protocols. Examples of how the communication may be performed were described above with reference to FIGS. 1 and 5.

Figure 3:
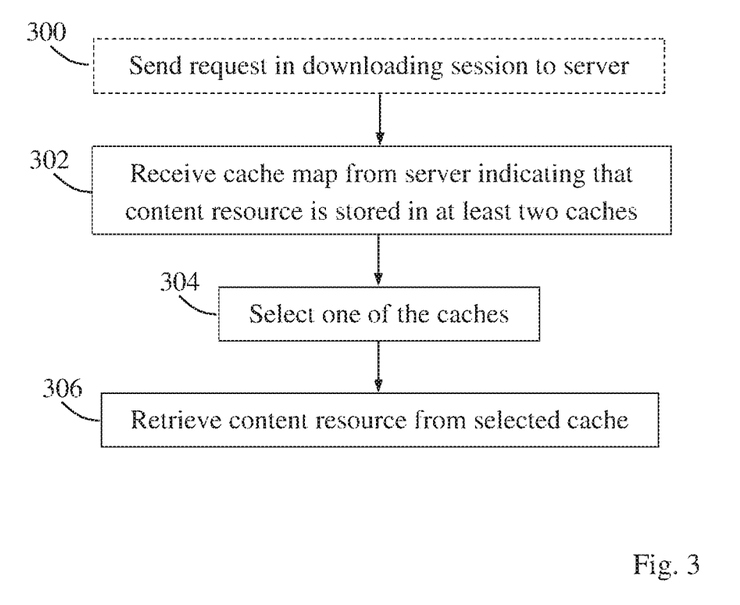
FIG. 3 is a flow chart illustrating a procedure in a client device, according to further possible embodiments.

The actions of FIGS. 2 and 3 may be performed by means of functional units in the respective processors 700P, 702P in the server 700 and the client device 702. For example, the server 700 may comprise means configured or arranged to perform at least some of the actions of the flow chart in FIG. 2 in the manner described above. Further, the client device 702 may comprise means configured or arranged to perform at least some of the actions of the flow chart in FIG. 3 in the manner described above.

The server 700 is arranged to handle cached content resources. The server 700 thus comprises the processor 700P and the memory 700M, said memory 700M comprising instructions executable by said processor 700P, whereby the server 700 is configured as follows.

The server 700 is configured to receive a download request from a client device 702 in a downloading session. This receiving operation may be performed by a receiving unit 700A in the server 700, e.g. in the manner described for action 200 above. The server 700 is also configured to identify a set of caches that can be accessed by the client device 702. This identifying operation may be performed by an identifying unit 700B in the server 700, e.g. in the manner described for action 202 above.

The server 700 is further configured to send a cache map to the client device 702 in a response to the received request, the cache map indicating that a first content resource is stored in a first cache of the identified set of caches and a second content resource is stored in a second cache of the identified set of caches. This sending operation may be performed by a sending unit 700C in the server 700, e.g. in the manner described for action 206 above.

The client device 702 is arranged to handle cached content resources. The client device 702 thus comprises the processor 702P and the memory 702M, said memory comprising instructions executable by said processor whereby the client device 702 is operative as follows.

The client device 702 may be configured to send a download request to the server 700 in a downloading session. This sending operation may be performed by a sending unit 702A in the client device 702, e.g. in the manner described for action 300 above. The client device 702 is configured to receive a cache map from the server 700 during a downloading session, the cache map indicating that at least one content resource is stored in at least two caches. This receiving operation may be performed by a receiving unit 702B in the client device 702, e.g. in the manner described for action 302 above.

The client device 702 is also configured to select one of the at least two caches. The selecting operation may be performed by a selecting unit 702C in the client device 702, e.g. in the manner described for action 304 above. The client device 702 is also configured to retrieve the at least one content resource from the selected cache. The retrieving operation may be performed by a retrieving unit 702D in the client device 702, e.g. in the manner described for action 306 above.

Figure 7:
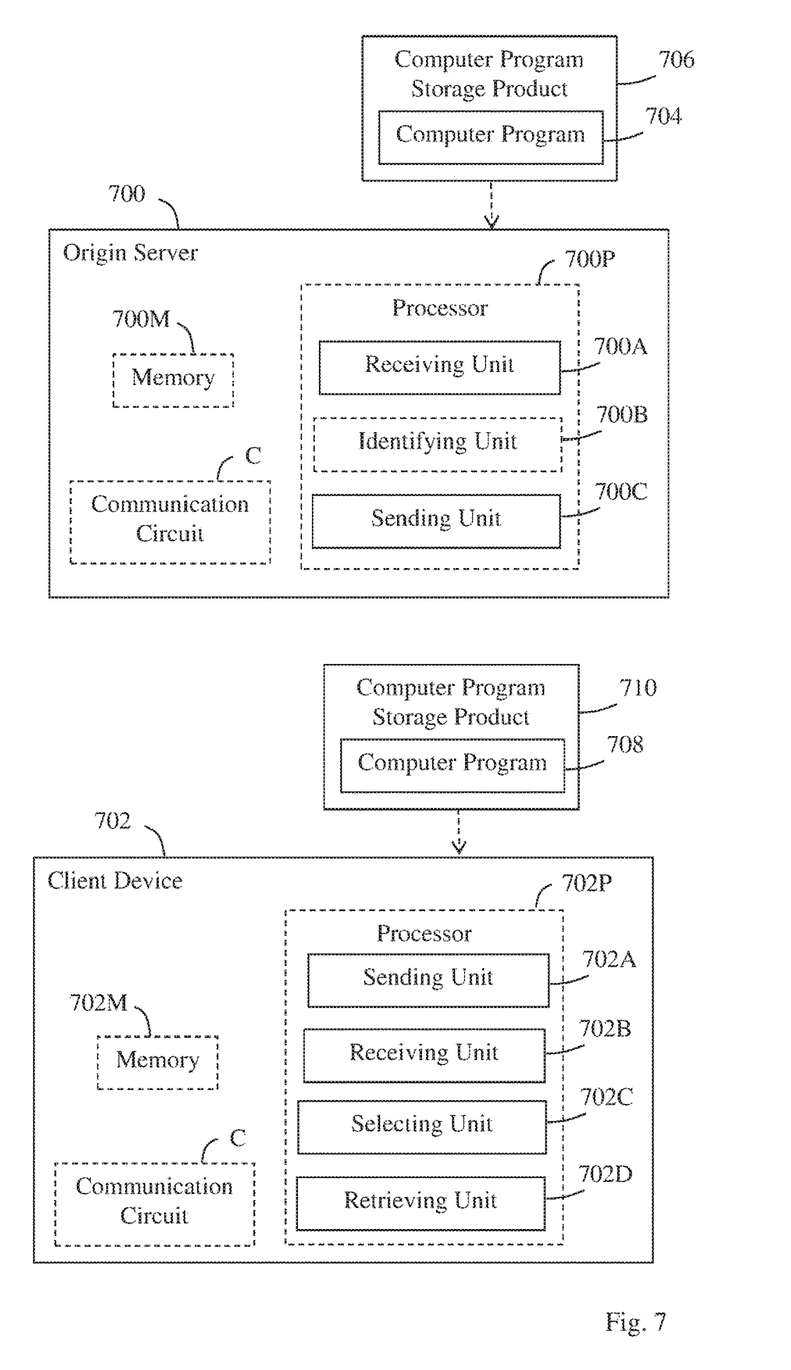
FIG. 7 is a block diagram illustrating a server and a client device in more detail, according to further possible embodiments.

It should be noted that FIG. 7 illustrates various functional units in the server 700 and the client device 702, respectively, and the skilled person is able to implement these functional units in practice using suitable software and hardware. Thus, the solution is generally not limited to the shown structures of the server 700 and the client device 702, and the functional units 700A-C and 702A-D therein may be configured to operate according to any of the features and embodiments described in this disclosure, where appropriate.

The functional units 700A-C and 702A-D described above may be implemented in the respective server 700 and client device 702 by means of a respective computer program 704 and 708 comprising code means which, when run by the processor 700P, 702P causes the respective server 700 and the client device 702 to perform the above-described actions and procedures. Each processor 700P, 702P may comprise a single Central Processing Unit (CPU), or could comprise two or more processing units. For example, each processor 700P, 702P may include a general purpose microprocessor, an instruction set processor and/or related chips sets and/or a special purpose microprocessor such as an Application Specific Integrated Circuit (ASIC). In other words, the mentioned functional units may be implemented in pure hardware. Each processor P may also comprise a storage for caching purposes.

Each computer program 704, 708 may be carried by a computer program storage product 706 and 710, respectively, in each of the server 700 and the client device 702 in the form of a memory having a computer readable medium and being connectable to the respective processor 700P, 702P. The computer program storage product 706, 710 in each of the server 700 and the client device 702 may thus comprise a computer readable medium on which the respective computer program 704, 708 is stored e.g. in the form of computer program modules or the like. For example, the memory 700M, 702M in each node may be a flash memory, a Random-Access Memory (RAM), a Read-Only Memory (ROM) or an Electrically Erasable Programmable ROM (EEPROM), and the program modules could in alternative embodiments be distributed on different computer program storage products in the form of memories within the respective server 700 and client device 702.

The solution described herein may thus be implemented in each of the server 700 and the client device 702 by a computer program 704, 708 comprising instructions which, when executed on the server 700 and the client device 702, cause the server 700 and the client device 702 to carry out the actions according to the above respective embodiments, where appropriate. The solution may also be implemented at each of the server 700 and the client device 702 in a computer program storage product 706, 710 comprising instructions which, when executed on the server 700 and the client device 702, cause the server 700 and the client device 702 to carry out the actions according to the above respective embodiments, where appropriate.

While the solution has been described with reference to specific exemplifying embodiments, the description is generally only intended to illustrate the inventive concept and should not be taken as limiting the scope of the solution. For example, the terms "server", "client device", "content resource", "cache", "cache map", "selection criterion", "selection criteria", "predefined condition" and "metadata" have been used throughout this disclosure, although any other corresponding entities, functions, and/or parameters could also be used having the features and characteristics described here. The solution is defined by the appended claims.

The invention claimed is:

1. A method performed by a server for handling cached content resources, the method comprising:
receiving, from a client device in a downloading session, a request for a content resource;
identifying a set of caches that are accessible to the client device; and
sending a cache map to the client device in a response to the received request, the cache map indicating that the content resource is stored in a first cache and a second cache of the identified set of caches;
wherein the content resource is transferred, before sending the cache map to the client device, to at least one of the first cache or the second cache.

2. A method performed by a server for handling cached content resources, the method comprising:
receiving, from a client device in a downloading session, a request for a content resource;
identifying a set of caches that are accessible to the client device; and
sending a cache map to the client device in a response to the received request, the cache map indicating that the content resource is stored in a first cache and a second cache of the identified set of caches;
wherein the cache map comprises at least one selection criterion controlling which one of the first cache or the second cache should be selected by the client device for retrieving the content resource.

3. The method according to claim 2, wherein the at least one selection criterion indicates that one of the first cache or the second cache should be selected for retrieving the content resource if a predefined condition is fulfilled.

4. The method according to claim 3, wherein the predefined condition is related to any of: time of day or week, current position of the client device, current battery status in the client device, available memory space in the client device, current network throughput, and retrieval cost.

5. The method according to claim 2, wherein the at least one selection criterion indicates one of the first cache or the second cache to be attempted first for retrieving the content resource.

6. The method according to claim 5, wherein the at least one selection criterion comprises priorities assigned to the first cache and the second cache to indicate an order for attempting to retrieve the content resource.

7. The method according to claim 2, wherein the at least one selection criterion is configured in dependence on a current load on the first cache and a current load on the second cache.

8. The method according to claim 2, wherein the cache map comprises a first encryption key useful for decrypting the content resource when retrieved from the first cache, and a second encryption key useful for decrypting the content resource when retrieved from the second cache.

9. The method according to claim 8, wherein the first encryption key is indicated by metadata in an entry for the first cache in the cache map, and the second encryption key is indicated by metadata in an entry for the second cache in the cache map.

10. The method according to claim 2, wherein the first cache and the second cache are polled to check if the content resource is stored in the first cache and the second cache before sending the cache map to the client device.

11. A server arranged to handle cached content resources, the server comprising:
communication circuitry configured to receive, from a client device in a downloading session, a request for a content resource; and
processing circuitry configured to:
identify a set of caches that are accessible to the client device; and
send, via the communication circuitry, a cache map to the client device in a response to the received request, the cache map indicating that the content resource is stored in a first cache and a second cache of the identified set of caches; and
wherein the processing circuitry is further configured to transfer the content resource to at least one of the first cache or the second cache, before the cache map is sent to the client device.

12. A server arranged to handle cached content resources, the server comprising:
communication circuitry configured to receive, from a client device in a downloading session, a request for a content resource; and
processing circuitry configured to:
identify a set of caches that are accessible to the client device; and
send, via the communication circuitry, a cache map to the client device in a response to the received request, the cache map indicating that the content resource is stored in a first cache and a second cache of the identified set of caches; and
wherein the cache map comprises at least one selection criterion controlling which one of the first cache or the second cache should be selected by the client device.

13. The server according to claim 12, wherein the at least one selection criterion indicates that one of the first cache or the second cache should be selected for retrieving the content resource if a predefined condition is fulfilled.

14. The server according to claim 13, wherein the predefined condition is related to any of: time of day or week, current position of the client device, current battery status in the client device, available memory space in the client device, current network throughput, and retrieval cost.

15. The server according to claim 12, wherein the at least one selection criterion indicates that one of the at least two caches should be attempted first for retrieving the content resource.

16. The server according to claim 15, wherein the at least one selection criterion comprises priorities assigned to the first cache or the second cache to indicate an order for attempting to retrieve the content resource.

17. The server according to claim 12, wherein the at least one selection criterion is configured in dependence on a current load on the first cache or the second cache.

18. The server according to claim 12, wherein the cache map comprises a first encryption key useful for decrypting the content resource when retrieved from the first cache, and a second encryption key useful for decrypting the content resource when retrieved from the second cache.

19. The server according to claim 18, wherein the first encryption key is indicated by metadata in an entry for the first cache in the cache map, and the second encryption key is indicated by metadata in an entry for the second cache in the cache map.

20. The server according to claim 12, wherein the processing circuitry is configured to poll the first cache and the second cache to check if the content resource is stored in the first cache and the second cache before sending the cache map to the client device.

21. A method performed by a client device for handling cached content resources, the method comprising:
receiving a cache map from a server during a downloading session, the cache map indicating that at least one content resource is stored in at least two caches that are accessible to the client device;
selecting, based on at least one selection criterion comprised in the cache map, one of the at least two caches; and
retrieving the at least one content resource from the selected cache.

22. The method according to claim 21, wherein the at least one selection criterion indicates that one of the at least two caches should be selected for retrieving the at least one content resource if a predefined condition is fulfilled.

23. The method according to claim 22, wherein the predefined condition is related to any of: time of day or week, current position of the client device, current battery status in the client device, available memory space in the client device, current network throughput, and retrieval cost.

24. The method according to claim 21, wherein the at least one selection criterion indicates that one of the at least two caches should be attempted first for retrieving the at least one content resource.

25. The method according to claim 24, wherein the at least one selection criterion comprises priorities assigned to the at least two caches to indicate an order for attempting to retrieve the at least one content resource.

26. The method according to claim 21, wherein said selecting of the selected cache and said retrieving of the at least one content resource from the selected cache is controlled by a caching agent implemented in one of:
a client application running in the client device,
a script of a ServiceWorker, and
a HyperText Transfer Protocol (HTTP) Library.

27. The method according to claim 21, wherein the cache map comprises a first encryption key useful for decrypting the at least one content resource when retrieved from a first one of the caches, and a second encryption key useful for decrypting the at least one content resource when retrieved from a second one of the caches.

28. The method according to claim 27, wherein the first encryption key is indicated by metadata in an entry for the first cache in the cache map, and the second encryption key is indicated by metadata in an entry for the second cache in the cache map.

29. The method according to claim 21, further comprising sending, before receiving the cache map, a request to the server for the at least one content resource during the downloading session.

30. A client device arranged to handle cached content resources, the client device comprising:
communication circuitry configured to receive a cache map from a server during a downloading session, the cache map indicating that at least one content resource is stored in at least two caches that are accessible to the client; and
processing circuitry configured to:
select, based on at least one selection criterion comprised in the cache map, one of the at least two caches; and
retrieve the at least one content resource from the selected cache.

31. The client device according to claim 30, wherein the at least one selection criterion indicates that one of the at least two caches should be selected for retrieving the at least one content resource if a predefined condition is fulfilled.

32. The client device according to claim 31, wherein the predefined condition is related to any of: time of day or week, current position of the client device, current battery status in the client device, available memory space in the client device, current network throughput, and retrieval cost.

33. The client device according to claim 30, wherein the at least one selection criterion indicates that one of the at least two caches should be attempted first for retrieving the at least one content resource.

34. The client device according to claim 33, wherein the at least one selection criterion comprises priorities assigned to the at least two caches to indicate an order for attempting to retrieve the at least one content resource.

35. The client device according to claim 30, wherein said selecting of the selected cache and said retrieving of the at least one content resource from the selected cache is controlled by a caching agent implemented in one of:
a client application running in the client device,
a script of a ServiceWorker, and
a HyperText Transfer Protocol (HTTP) Library.

36. The client device according to claim 30, wherein the cache map comprises a first encryption key useful for decrypting the at least one content resource when retrieved from a first one of the caches, and a second encryption key useful for decrypting the at least one content resource when retrieved from a second one of the caches.

37. The client device according to claim 36, wherein the first encryption key is indicated by metadata in an entry for the first cache in the cache map, and the second encryption key is indicated by metadata in an entry for the second cache in the cache map.

38. The client device according to claim 30, wherein the communication circuitry is further configured to, before receiving the cache map, send a request to the server for the at least one content resource during the downloading session.

39. A non-transitory computer-readable storage medium storing a computer program comprising instructions that, when executed on at least one processor of a server, cause the server to:
- receive, from a client device in a downloading session, a request for a content resource;
- identify a set of caches that are accessible to the client device; and
- send a cache map to the client device in a response to the received request, the cache map indicating that the content resource is stored in a first cache and a second cache of the identified set of caches; and
- wherein the cache map comprises at least one selection criterion controlling which one of the first cache or the second cache should be selected by the client device.

40. A non-transitory computer-readable storage medium storing a computer program comprising instructions that, when executed on at least one processor of a client device, cause the client device to:
- receive a cache map from a server during a downloading session, the cache map indicating that at least one content resource is stored in at least two caches that are accessible to the client;
- select, based on at least one selection criterion comprised in the cache map, one of the at least two caches; and
- retrieve the at least one content resource from the selected cache.

* * * * *